United States Patent
Rogers et al.

(10) Patent No.: US 7,544,222 B2
(45) Date of Patent: *Jun. 9, 2009

(54) ACTIVATED, COAL-BASED CARBON FOAM

(75) Inventors: Darren Kenneth Rogers, Wheeling, WV (US); Janusz Wladyslaw Plucinski, Glen Dale, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 616 days.

This patent is subject to a terminal disclaimer.

(21) Appl. No.: 10/810,900

(22) Filed: Mar. 29, 2004

(65) Prior Publication Data

US 2004/0178143 A1    Sep. 16, 2004

Related U.S. Application Data

(63) Continuation of application No. 09/976,172, filed on Oct. 12, 2001, now Pat. No. 6,833,011.

(51) Int. Cl.
*C10L 5/00*    (2006.01)

(52) U.S. Cl. ............. 44/620; 44/607; 423/445 R; 423/448; 423/460

(58) Field of Classification Search ............ 44/607; 156/78; 264/29.6, 29.7; 423/445 R, 448, 423/460; 428/489

See application file for complete search history.

(56) References Cited

U.S. PATENT DOCUMENTS

| | | | |
|---|---|---|---|
| 3,309,437 A | 3/1967 | Harnett | 423/460 |
| 4,127,391 A | 11/1978 | Koppelman | 44/282 |
| 6,833,011 B2* | 12/2004 | Rogers et al. | 44/607 |

FOREIGN PATENT DOCUMENTS

GB    1489690    10/1977

* cited by examiner

*Primary Examiner*—Cephia D Toomer
(74) *Attorney, Agent, or Firm*—Philip D. Lane

(57) ABSTRACT

An ablation resistant, monolithic, activated, carbon foam produced by the activation of a coal-based carbon foam through the action of carbon dioxide, ozone or some similar oxidative agent that pits and/or partially oxidizes the carbon foam skeleton, thereby significantly increasing its overall surface area and concurrently increasing its filtering ability. Such activated carbon foams are suitable for application in virtually all areas where particulate or gel form activated carbon materials have been used. Such an activated carbon foam can be fabricated, i.e. sawed, machined and otherwise shaped to fit virtually any required filtering location by simple insertion and without the need for handling the "dirty" and friable particulate activated carbon foam materials of the prior art.

13 Claims, 1 Drawing Sheet

ACTIVATED, COAL-BASED CARBON FOAM

CROSS REFERENCE TO RELATED APPLICATIONS

The present application is a continuation of and claims, under 35 U.S.C.§ 120, the benefit of U.S. patent application Ser. No. 09/976,172, filed on Oct. 12, 2001, now U.S. Pat. No. 6,833,011, which is expressly incorporated fully herein by reference.

STATEMENT REGARDING FEDERALLY SPONSORED RESEARCH OR DEVELOPMENT

This invention was made with Government support under contract number DE-FG02-00ER83112 awarded by the Department of Energy. The Government has certain rights in the invention.

FIELD OF THE INVENTION

The present invention relates to foam-based carbon foams and more particularly to activated such foams that provide porous, monolithic and structurally sound activated carbon materials for filtration applications.

BACKGROUND OF THE INVENTION

Activated carbon and filters made therewith are well known in the art. Such filters conventionally comprise masses of activated carbon particulate that is loaded into a permeable frame with the combination of the permeable frame and the contained activated carbon particulate serving as the filtering medium. Alternative similar structures using gell forms of activated carbon are also well known. While such arrangements are entirely satisfactory for many applications and provide entirely satisfactory filtering of fluids, especially gases, their use is often cumbersome or expensive due to the requirement that the activated carbon particulate must be loaded into some kind of permeable frame or container to obtain the desired filter element. Additionally, since carbon particles are, by their very physical nature, "dirty" and dusty, i.e. friable and not particularly durable, the handling thereof for purposes of loading the filter element is at best inconvenient and time consuming and at worst dangerous and costly. This is particularly true in the case of smaller filter elements that require changing of the filter medium only occasionally, such as in the case of furnace filters for the home and the like.

Thus, the availability of a monolithic activated carbon filter material that provides all of the advantages of an activated carbon particulate filter, but does not require the handling of particulate carbon to obtain these advantages would be highly desirable. Such an activated carbon material available as a monolithic pre-sized element that can easily inserted into a duct or other fluid conduit would be highly useful.

OBJECT OF THE INVENTION

It is therefore an object of the present invention to provide a monolithic, activated carbon foam that can replace prior art activated carbon particulate filters that require the handling of ablative carbon particulate or gels.

SUMMARY OF THE INVENTION

According to the present invention, there is provided an ablation resistant, monolithic, activated, carbon foam produced by the activation of a coal-based carbon foam through the action of carbon dioxide, ozone or some similar oxidative agent that pits and/or partially oxidizes the carbon foam skeleton, thereby significantly increasing its overall surface area and concurrently increasing its filtering ability. Such activated carbon foams are suitable for application in virtually all areas where particulate or gel form activated carbon materials have been used. Such an activated carbon foam can be fabricated, i.e. sawed, machined and otherwise shaped to fit virtually any required filtering location by simple insertion and without the need for handling the "dirty" and dusty particulate activated carbon foam materials of the prior art.

DETAILED DESCRIPTION

Figure 1:
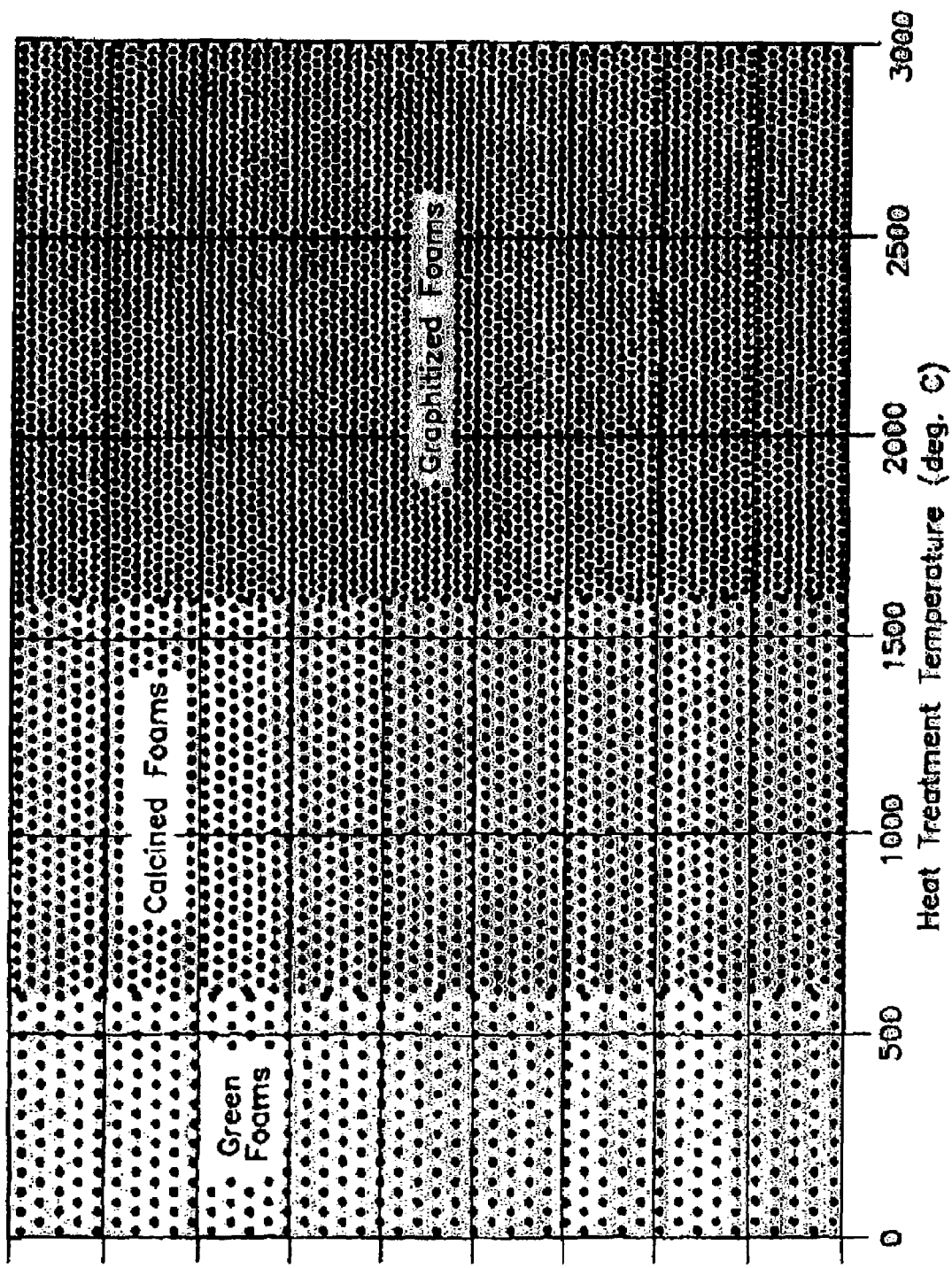
FIG. 1 is a graph showing the heat treatment temperatures for the various phases of the production process used in the fabrication of the activated carbon foam of the present invention.

U.S. patent application Ser. No. 09/453,729 filed Dec. 2, 1999 and entitled, "Coal-Based Carbon Foams", now abandoned, which is incorporated herein by reference in its entirety, describes a family of carbon foams having a density of preferably between about 0.1 g/cm$^3$ and about 0.8 g/cm$^3$ that are produced by the controlled heating of coal particulate preferably up to ¼ inch in diameter in a "mold" and under a non-oxidizing atmosphere. The process described in this application comprises: 1) heating a coal particulate of preferably small i.e., less than about ¼ inch particle size in a "mold" and under a non-oxidizing atmosphere at a heat up rate of from about 1 to about 20° C. to a temperature of between about 300 and about 700° C.; 2) soaking at a temperature of between about 300 and 700° C. for from about 10 minutes up to about 12 hours to form a green foam; and 3) controllably cooling the green foam to a temperature below about 100° C. According to the method described in the aforementioned application, the porous foam product of this process is subsequently preferably carbonized by the application of known techniques, for example, soaking at a temperature of between about 800° C. and about 1200° C. for a period of from about 1 to about 3 hours. Although this is the preferred temperature range for carbonization, carbonization actually occurs at temperatures between about 600° C. and 1600° C.

Graphitization, commonly involves heating the green foam either before or after carbonization at a heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres.

While carbon foams prepared as just described are useful "as fabricated" for filtering applications, they are not particularly satisfactory in many of these application because of their relatively low overall surface area of from about 1.0 m$^2$/g to about 2.0 m$^2$/g. It has now been discovered that the filtering ability of such coal-based carbon foams can be increased, as measured by their overall surface area, by activation with, for example $CO_2$ or ozone. Such treatment apparently causes pitting of the carbon foam skeleton through oxidation thereof and increases the overall surface area of such materials to a level of between about 10 m$^2$/g to about 25 m$^2$/g, and preferably between about 15 m$^2$/g to about 20 m$^2$/g, depending upon the level, i.e. duration and intensity of the activation procedure. At these overall surface area levels, the carbon foams of the present invention provide excellent monolithic filtration media that exhibit all of the desirable strength, ablation resistance, and ease of fabrication benefits of the parent coal-based carbon foams.

The method of producing the activated carbon foams of the present invention comprises initially: 1) heating a coal particulate of preferably small, i.e. less than about ¼ inch particle size in a "mold" and under an inert or non-oxidizing atmosphere at a heat up rate of from about 1 to about 20° C. to a temperature of between about 300 and about 600° C.; 2) soaking at a temperature of between about 300 and 600° C. for from about 10 minutes up to about 12 hours to form a "green foam"; and 3) controllably cooling the "green foam" to a temperature below about 100° C. The green foam may be subsequently carbonized and/or graphitized as describe hereinafter in an inert or non-oxidizing atmosphere to produce a carbonized or graphitized foam. The inert or non-oxidizing atmosphere may be provided by the introduction of inert or non-oxidizing gas into the "mold" at a pressure of from about 0 psi, i.e., free flowing gas, up to about 500 psi. The inert gas used may be any of the commonly used inert or non-oxidizing gases such as nitrogen, helium, argon, $CO_2$, etc.

It is generally not desirable that the reaction chamber or mold be vented or leak during this heating and soaking operation. The pressure of the mold or chamber and the increasing volatile content therein tends to retard further volatilization while the cellular product sinters at the indicated elevated temperatures. If the mold or chamber is vented or leaks during soaking, an insufficient amount of volatile matter may be present to permit inter-particle sintering of the coal particles thus resulting in the formation of a sintered powder as opposed to the desired cellular product. Thus, according to a preferred embodiment of the present process, venting or leakage of non-oxidizing gas and generated volatiles is inhibited consistent with the production of an acceptable cellular product.

Additional more conventional blowing agents may be added to the particulate prior to expansion to enhance or otherwise modify the pore-forming operation.

The term "mold", as used herein is meant to define any mechanism for providing controlled dimensional forming of the expanding coal or carbon or containing the foaming operation. Thus, any chamber into which the coal particulate and carbide precursor blend is deposited prior to or during heating and which, upon the foam precursor attaining the appropriate expansion temperature, contains the expanding carbon to some predetermined configuration such as: a flat sheet; a curved sheet; a shaped object; a building block; a rod; tube or any other desired solid shape can be considered a "mold" for purposes of the instant invention. The term "mold" as used herein, is also meant to include any container, even an open topped container that "contains" the expanding mixture so long as such a device is contained in a pressurizable vessel that will permit controlled foaming as described herein. Clearly, a container that results in the production of some particular near net or net shape is particularly preferred.

As will be apparent to the skilled artisan familiar with pressurized gas release reactions, as the pressure in the reaction vessel, in this case the mold increases, from 0 psi to 500 psi, as imposed by the inert or non-oxidizing gas, the reaction time will increase and the density of the produced porous coal will increase as the size of the "bubbles" or pores produced in the expanded carbon decreases. Similarly, a low soak temperature at, for example about 400° C. will result in a larger pore or bubble size and consequently a less dense expanded coal than would be achieved with a soak temperature of about 600° C. Further, the heat-up rate will also affect pore size, a faster heat-up rate resulting in a smaller pore size and consequently a denser expanded coal product than a slow heat-up rate. These phenomenon are, of course, due to the kinetics of the volatile release reactions which are affected, as just described, by the ambient pressure and temperature and the rate at which that temperature is achieved. These process variables can be used to custom produce the expanded coals of the present invention in a wide variety of controlled densities, strengths etc.

Cooling of the "green foam" after soaking is not particularly critical except as it may result in cracking of thereof as the result of the development of undesirable thermal stresses. Cooling rates less than 10° C./min to a temperature of about 100° C. are typically used to prevent cracking due to thermal shock. Somewhat higher, but carefully controlled, cooling rates may however, be used to obtain a "sealed skin" on the open cell structure of the product as described below. The rate of cooling below 100° C. is in no way critical.

After expanding the carbon material as just described, the "green foam" is an open celled material. Several techniques have been developed for selectively "sealing" the surface of the open celled structure to improve its adhesive capabilities for further fabrication and assembly of a number of parts. For example, a layer of a commercially available graphitic adhesive (for example an epoxy-graphite adhesive) can be coated onto portions of the surface and cured at elevated temperature or allowed to cure at room temperature to provide an adherent skin.

After expanding, the "green foam" is readily machineable, sawable and otherwise readily fabricated using conventional fabrication techniques.

A variety of additives and structural reinforcers may be added to the carbon materials of the present invention either before or after expansion to enhance specific mechanical properties such as fracture strain, fracture toughness and impact resistance. For example, particles, whiskers, fibers, plates, etc. of appropriate carbonaceous or ceramic composition can be incorporated into the abrasive foam to enhance its mechanical properties.

The activated foams of the present invention can additionally be impregnated with; for example, petroleum pitch, epoxy resins or other polymers using a vacuum assisted resin transfer type of process. The incorporation of such additives provides load transfer advantages similar to those demonstrated in carbon composite materials. In effect a 3-D composite is produced that demonstrates enhanced impact resistance and load transfer properties.

The cooling step in the expansion process results in some relatively minimal shrinkage on the order of less than about 5% and generally in the range of from about 2% to about 3%. This shrinkage must be accounted for in the production of near net shape or final products of specific dimensions and is readily determinable through trial and error with the particular carbon starting material being used. The shrinkage may be further minimized by the addition of some inert solid material such as coke particles, ceramic particles, ground waste from the coal expansion process etc. is as common practice in ceramic fabrication.

According to the method of the present invention, subsequent to the production of the "green foam" as just described, the "green foam" may be subjected to carbonization and graphitization within the controlled conditions described below to obtain activated foams that exhibit specific thermal or electrical conductivity or insulating properties or strengths for specific applications.

Carbonization, sometimes referred to as calcining, is conventionally performed by heating the green foam under an appropriate inert gas at a heat-up rate of less than about 5° C. per minute to a temperature of between about 600° C. and about 1600° C. and preferably between about 800° C. and about 1200° C. and soaking for from about 1 hour to about three or more hours. Appropriate inert gases are those described about that are tolerant of these high temperatures. The inert atmosphere is supplied at a pressure of from about 0 psi up to a few atmospheres. The carbonization/calcination process serves to remove substantially all of the non-carbon elements present in the green foam such as sulfur, oxygen, hydrogen, etc.

Graphitization, commonly involves heating the carbon foam either before or after carbonization at heat-up rate of less than about 10° C. per minute, preferably from about 1° C. to about 5° C. per minute, to a temperature of between about 1700° C. and about 3000° C. in an atmosphere of helium or argon and soaking for a period of less than about one hour. Again, the inert gas may be supplied at a pressure ranging from about 0 psi up to a few atmospheres. According to a preferred embodiment of the process described herein, the activated foams of the present invention are produced by sequentially carbonizing and then graphitizing the green foam as described above.

Activation of the coal-based carbon foams prepared as described hereinabove is achieved by flowing carbon dioxide or ozone through the carbon foam, "green" foam, calcined foam or graphitized foam, at elevated temperature to partially oxidize and pit the carbon foam. The activation process involves placing the carbon foam into a heated container and flowing the oxidative gas, for example $CO_2$ or ozone through the carbon foam at elevated temperature for a period of time adequate to obtain the required oxidation/pitting. Specific operative processing conditions include but are not limited to gas flow rated on the order of from about 1 to about 10 cubic feet per minute for a period of from about 1 to about 12 hours at a temperature of between about 600° C. and about 1200° C. Depending upon the level of activation desired, these operating parameters can be varied broadly to obtain activated foams of varying levels of activation. As shown in example 1 below, specifically preferred operating ranges include gas flow rates on the order of 4 to 5 cubic feet per minute after an initional purge at a temperature of between about 800° C. and about 1200° C. for a period of between about 2 and about 6 hours. As will be apparent to the skilled artisan, the level of "activation" i.e. increase in overall surface area will be dependent upon the duration of the activation process as well as the temperature at which the activation is performed and the oxidative potential of the activating agent, $CO_2$ or ozone. It has generally been found that treatments that do not adversely affect the carbon foam or its structure yield activated foams demonstrating overall surface areas in the range of between about 10 $m^2/g$ and about 25 $m^2/g$. A preferred overall surface area is between about 15 $m^2/g$ and about 20 $m^2/g$.

The following example will serve to better illustrate the successful practice of the invention.

EXAMPLES

A laboratory scale activation cell was made from 3 inch inside diameter pipe, end caps and tube fittings (to provide gas access to the interior of the cell)—all fabricated from 304 stainless steel. The cell was situated vertically in a Harper SiC heating element furnace on a firebrick pedestal. Carbonized coal-based carbon foam samples 3.0 inches in diameter and 0.5 inches in thickness were loaded into the cell and separated by 304 stainless steel folded expanded metal standoffs. The foam samples were made from Powellton bituminous coal having a bulk density of about 30 pounds per cubic foot and had been prepared as described hereinabove and calcined at 1050° C. to remove volatile material therefrom. A plug of very fine (#00) steel wool was placed beneath the lower foam sample and above the upper foam sample to scavenge oxygen in the cell and to prevent over oxidation. The cell was sealed and the 304 stainless steel tubing fed through a sight port in the door of the furnace. A pair of ¼ inch stainless steel tubes were connected via compression fittings to: 1) additional tubing that connected to a type 320 carbon dioxide regulator atop a compressed carbon dioxide tank; and 2) an exhaust port to permit venting of gas from the cell. The tubing was connected so that gas entered the cell from the bottom and passed through the steel wool and carbon foam samples before exiting the top of the cell.

The following furnace profile was used:

Heat at 2° C. per minute from ambient up to 900° C.;

Hold at 900° C. for 2 and 6 hours for each of two experiments; and

Turn furnace power off and cool to ambient (controlled rate).

Carbon dioxide, after an initial 10 cubic feet per minute purge, was passed through the reactor at 4-5 cubic feet per minute for the duration of each experiment. In both experiments, two foam samples were loaded in the activation cell. In the two hour test, a "green" foam sample was included in place of a calcined sample. This sample was expected to lose about 15% of its mass during the process as it calcined, plus whatever activation losses occurred. Mass losses and dimensional changes are reported in Table 1 below.

TABLE 1

| Experiment | Time at 900° C. | Initial Mass(g) | Final Mass(g) | MassLoss(%) |
|---|---|---|---|---|
| 1, Calcined | 2 hours | 18.03 | 17.24 | 4.3 |
| 1, "Green" | 6 hours | 13.97 | 11.2 | 20.4 |
| 2, calcined | 6 hours | 21.18 | 18.17 | 14.2 |
| 2, calcined | 6 hours | 21.38 | 18.95 | 11.4 |

All samples had an initial overall surface area of between 1 $m^2/g$ and 2 $m^2/g$ and a final overall surface area of between 15 $m^2/g$ and 20 $m^2/g$.

As will be apparent to the skilled artisan, either before or after activation as described herein, the carbon foam structures of the present invention may be fabricated into any appropriate shape for the production of carbon filter elements. The fabricability by sawing, machining or otherwise of the coal-based carbon foams from which the activated foam is produced allows the production of monolithic filter elements of virtually any desired shape.

As the invention has been described, it will be apparent to those skilled in the art that the same may be varied in many ways without departing from the spirit and scope of the invention. Any and all such modifications are intended to be included within the scope of the appended claims.

What is claimed is:

1. An activated carbon foam comprising a surface area ranging from about 10 $m^2/g$ to about 25 $m^2/g$ manufactured by the process comprising:

heating swellable particulate coal to a temperature between about 300° C. and about 700° C. under a non-oxidizing atmosphere at a pressure ranging from about 25 psi to about 500 psi and soaking at said temperature for from about 10 minutes to about 12 hours to produce a carbon foam; and activating said carbon foam by flowing an activation agent through said carbon foam for a period ranging from about 1 hour to about 12 hours at a temperature ranging from about 600° C. to about 1200° C., thus producing an activated carbon foam.

2. The activated carbon foam of claim 1, wherein the activating agent comprises ozone.

3. The activated carbon foam of claim 1, wherein the activating agent comprises carbon dioxide.

4. The activated carbon foam of claim 1, wherein the process further comprises the step of carbonizing the carbon foam to form a carbonized foam by heating to a temperature ranging from about 600° C. to about 1600° C. in an inert atmosphere and holding at the temperature for a period of time ranging from about 1 hour to about 3 hours.

5. The activated carbon foam of claim 1, wherein the process further comprises the step of graphitizing said carbon foam by heating said carbon foam to a temperature ranging from about 1700° C. to about 3000° C. in an inert atmosphere and holding at the temperature for a period of time less than about 1 hour.

6. An activated carbon foam comprising an open-celled carbon foam having a density up to about 0.8 g/cc, a surface area from about 10 $m^2/g$ to about 25 $m^2/g$, wherein a surface of the open-celled carbon foam is sealed.

7. The activated carbon foam of claim 6, wherein the carbon foam has a density between about 0.1 g/cc and about 0.8 g/cc.

8. The activated carbon foam of claim 6, wherein the carbon foam has a surface area between about 10 $m^2/g$ and about 25 $m^2/g$.

9. The activated carbon foam of claim 6, wherein the carbon foam has a surface area between about 15 $m^2/g$ and about 20 $m^2/g$.

10. The activated carbon foam of claim 6, wherein the carbon foam is impregnated with a polymer.

11. The activated carbon foam of claim 6, wherein the carbon foam is impregnated with an epoxy resin.

12. The activated carbon foam of claim 6, wherein the carbon foam is impregnated with a petroleum pitch.

13. The activated carbon foam of claim 1, wherein the activation agent is introduced to said carbon foam at a rate in the range of about 1 $ft^3$/minute to about 10 $ft^3$/minute.

* * * * *